March 15, 1960 W. A. HALLISEY 2,928,176
LAND LEVELING COMPUTING DEVICE
Filed Nov. 19, 1956 5 Sheets-Sheet 2
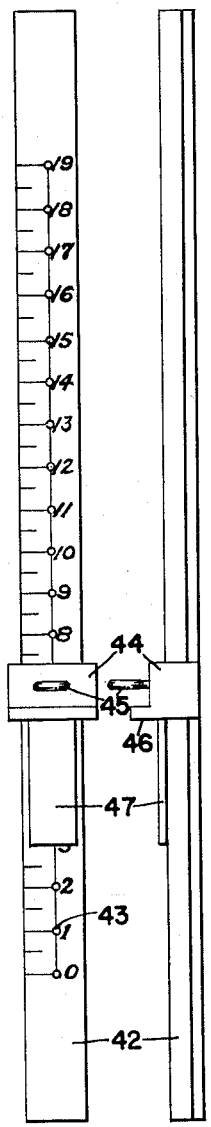
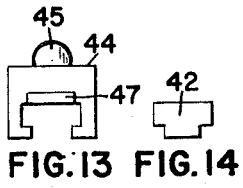
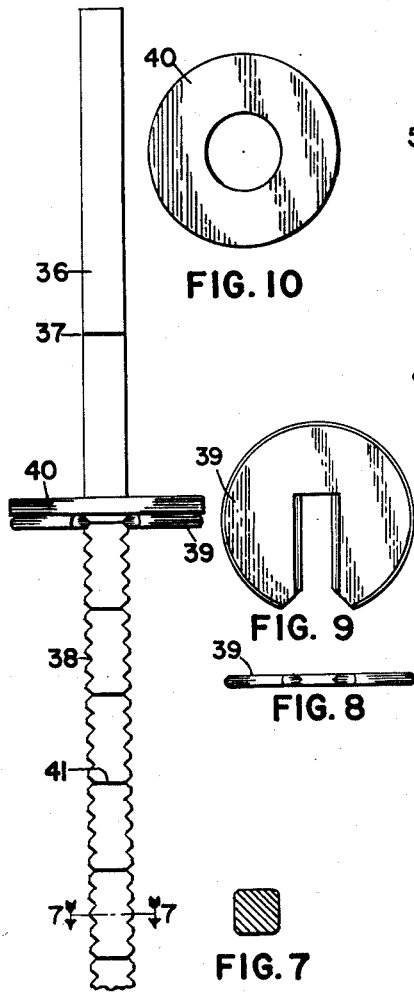
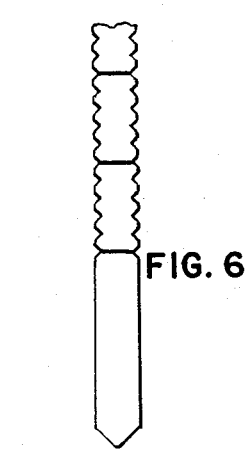
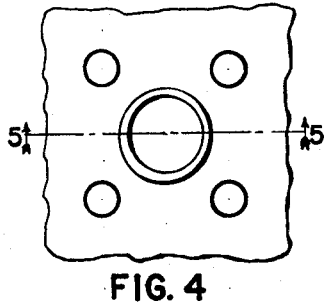
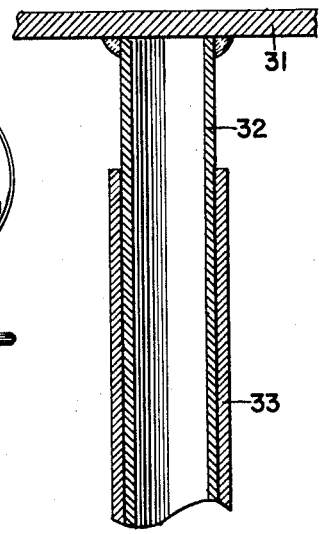
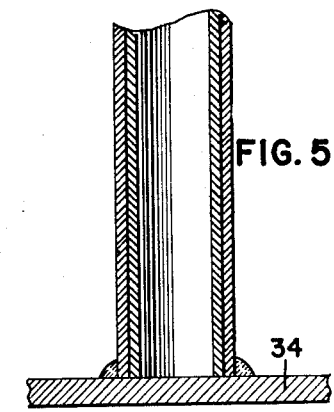
INVENTOR:

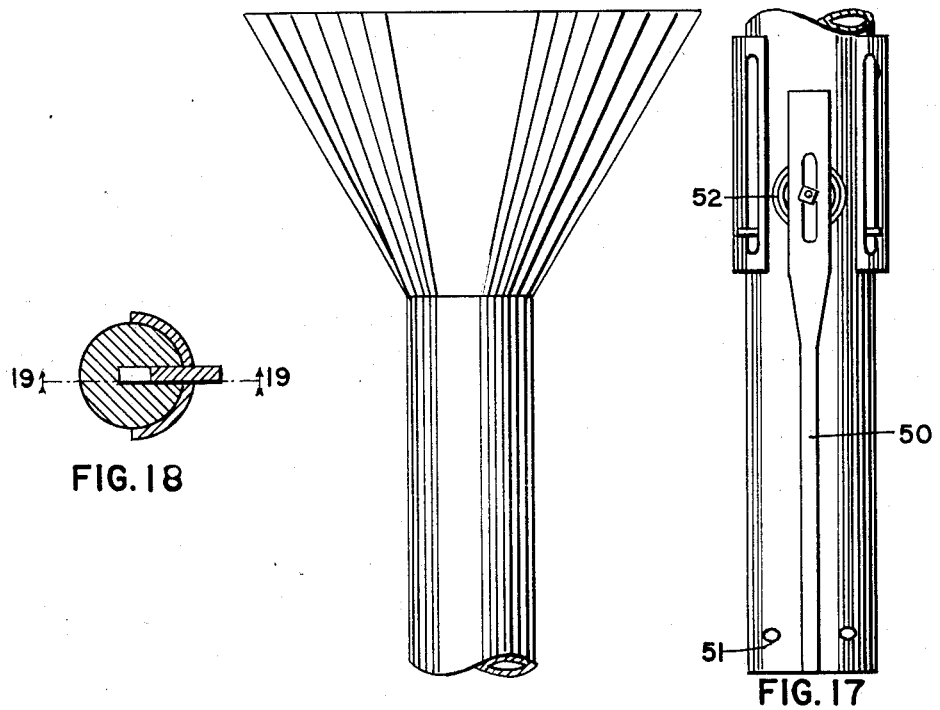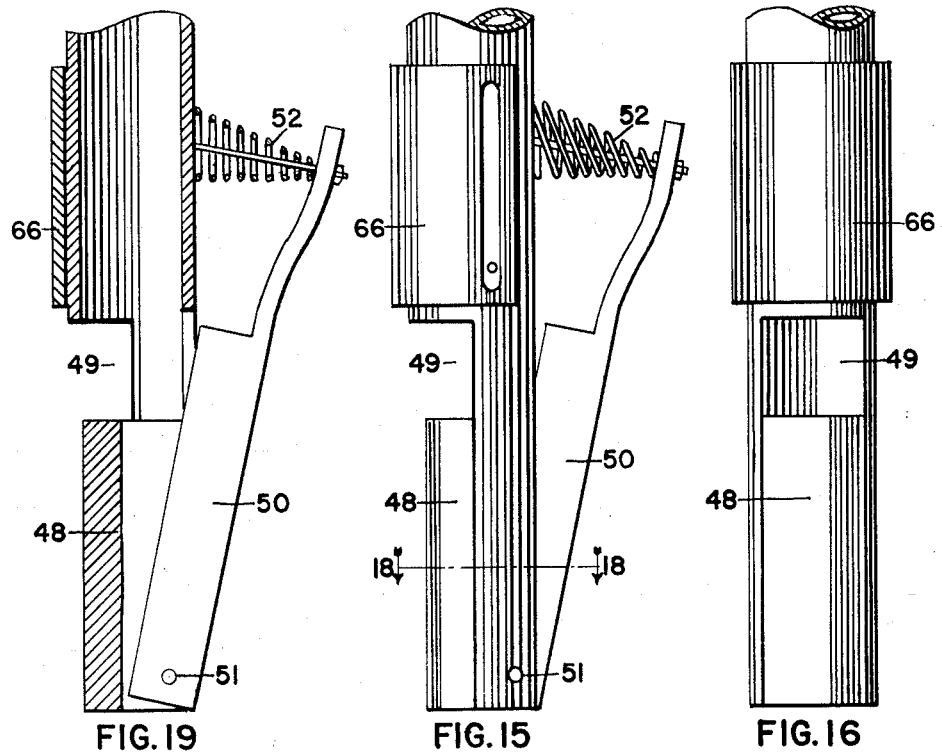

March 15, 1960  W. A. HALLISEY  2,928,176
LAND LEVELING COMPUTING DEVICE
Filed Nov. 19, 1956  5 Sheets-Sheet 3
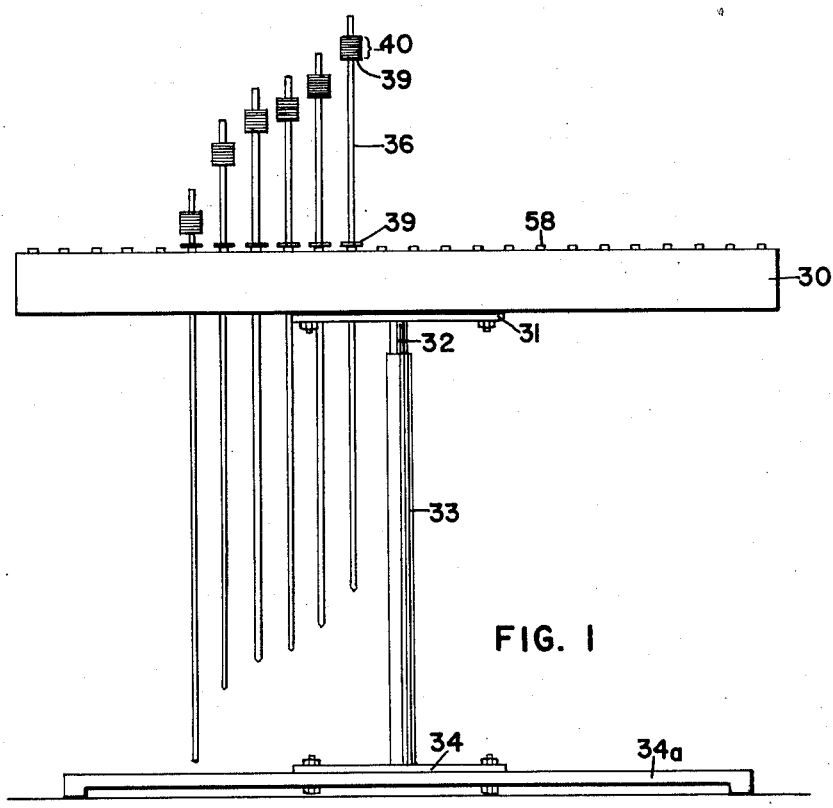
FIG. 1
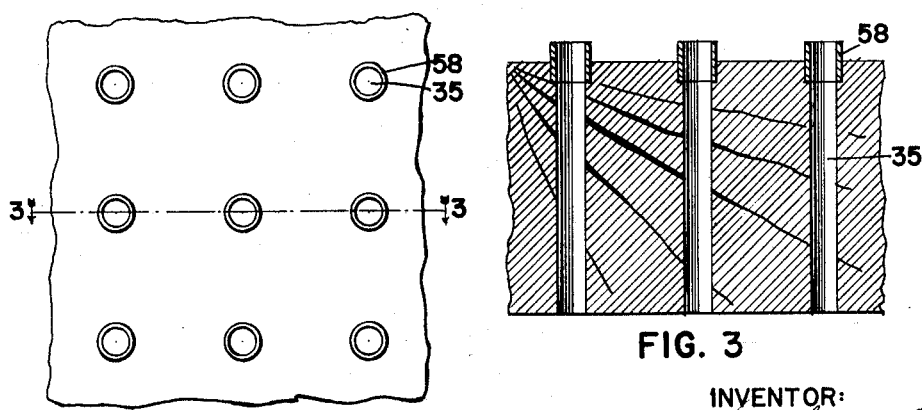
FIG. 2
FIG. 3
INVENTOR:
William Alexander Hallisey

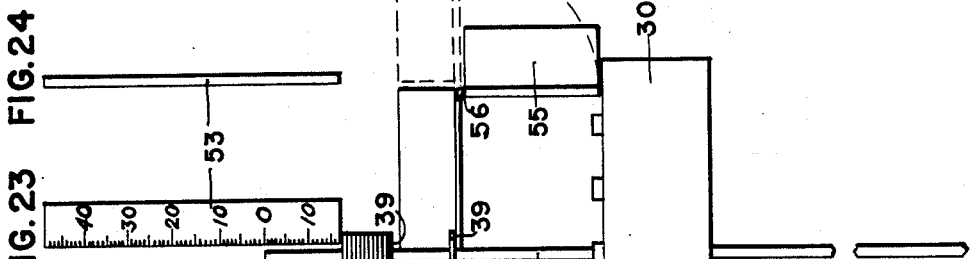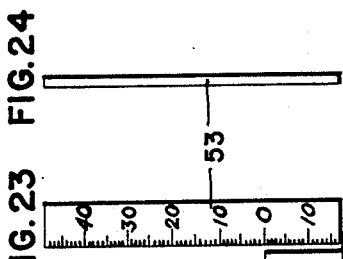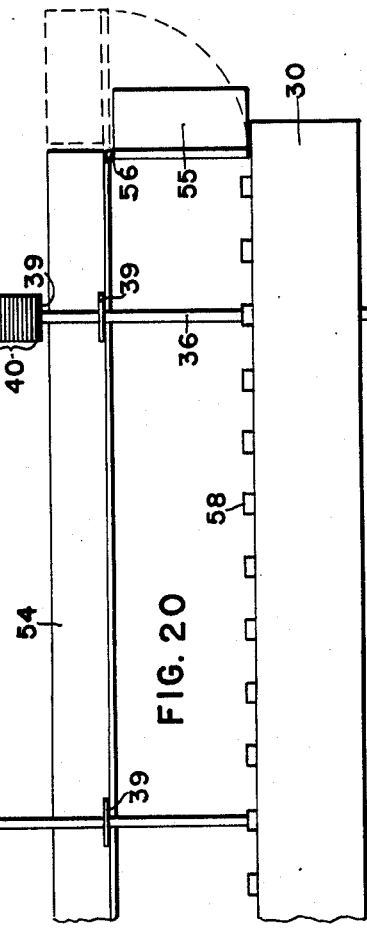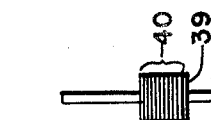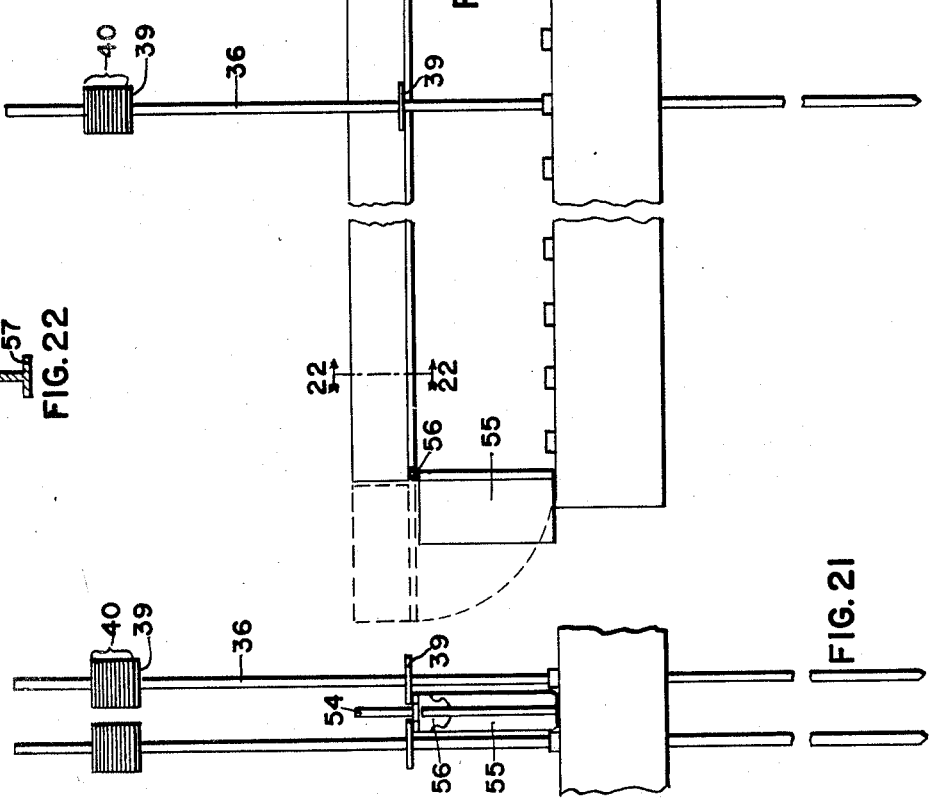

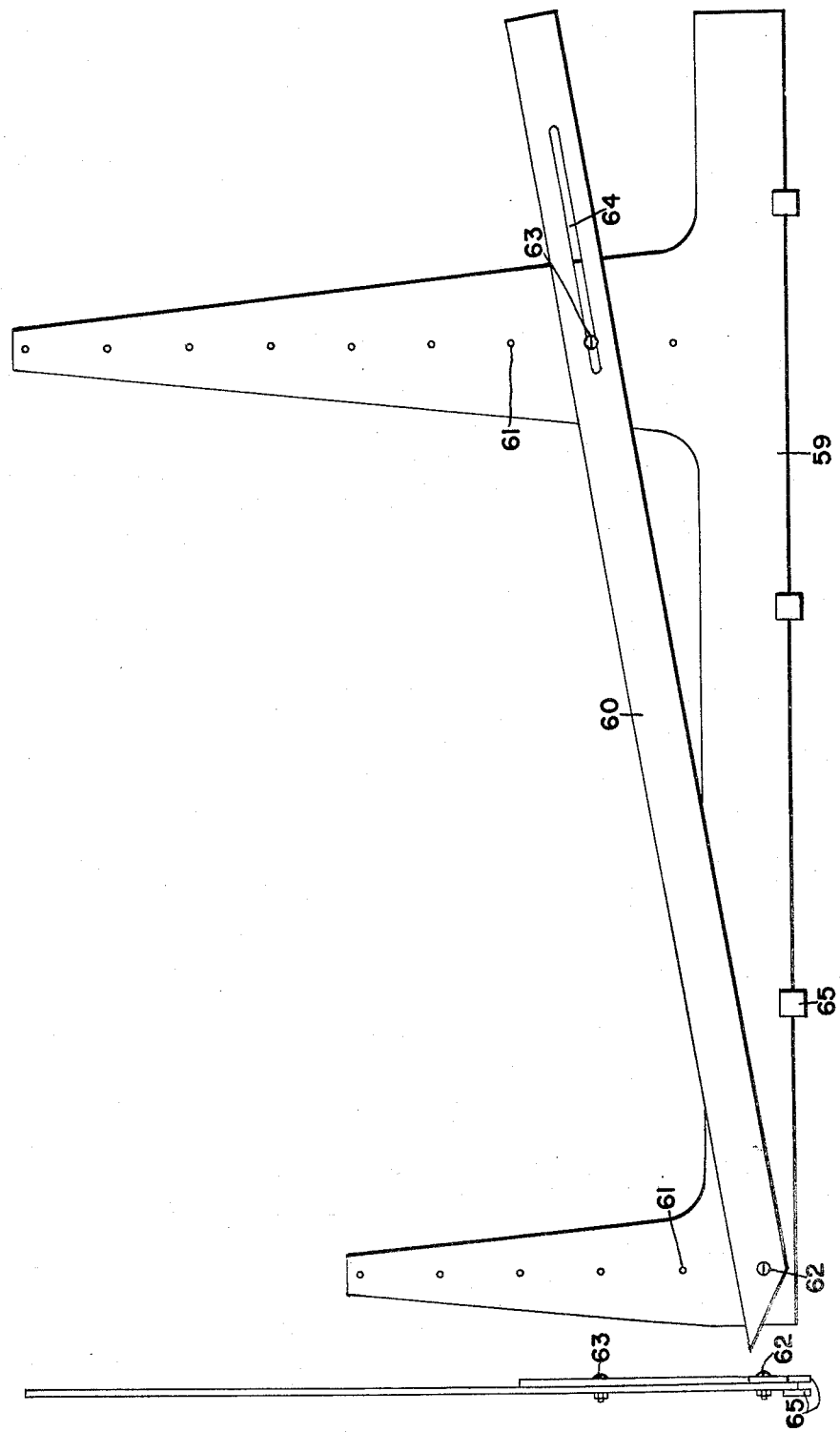

United States Patent Office 2,928,176
Patented Mar. 15, 1960

1

2,928,176

LAND LEVELING COMPUTING DEVICE

William Alexander Hallisey, Sacramento, Calif.

Application November 19, 1956, Serial No. 622,855

6 Claims. (Cl. 33—1)

My invention is a land leveling computing machine which enables the operator to compute quantitatively cuts and fills for land to be leveled or graded from a spirit level field survey.

The objects of my invention are:

(1) To represent, from a gridded spirit level survey, the surface shape of the land to be leveled or graded by a three-dimensional scaled model.

(2) To be able to change the surface shape of the model easily.

(3) To be able to measure easily the change in surface shape of the model.

(4) To be able to view any selected cross-sectional surface profile of the model.

(5) To be able to change the surface shape of the model to a desired grade.

(6) To be able to rotate the machine horizontally in a complete circle for viewing from any direction.

(7) Finally, to be able to arrive at any desired cut to fill percentage.

It is to be noted that the figures on the drawings are on various scales; the symbol "X" being used as the basic scale for all parts of the device. Thus, if a figure of the drawings is stated as being on a scale of ½X, for example, it will have a relative size one-half that of a figure drawn to the scale of X.

Fig. 1 is an elevation of the table of the device with the pegs installed, scale ¼X.

Fig. 2 is a fragmentary plan of the table top, scale X.

Fig. 3 is a vertical section on line 3—3 of Fig. 2.

Fig. 4 is a fragmentary under side plan of the central table-supporting capital and the shaft depending therefrom, scale X.

Fig. 5 is a vertical section on line 5—5 of Fig. 4, but including the shaft-supporting sleeve and base, scale X.

Fig. 6 is a fragmentary elevation of one of the pegs, showing a disc-supporter and a disc thereon, scale 2X.

Fig. 7 is a cross section of a peg on line 7—7 of Fig. 6.

Fig. 8 is a side or edge view of a peg-disc supporter, scale 2X.

Fig. 9 is a plan view of the same.

Fig. 10 is a plan view of a disc, scale 2X.

Fig. 11 is a side view of the peg measurer, with the indicator thereon, scale ½X.

Fig. 12 is a top view of the same, scale ½X.

Fig. 13 is a front view of the indicator, scale ½X.

Fig. 14 is an end view of the peg measurer, scale ½X.

Fig. 15 is a side view of the disc-dispenser, scale X.

Fig. 16 is a front view of the lower portion of the disc-dispenser, scale X.

Fig. 17 is a rear view of the lower portion of the disc-dispenser, scale X.

Fig. 18 is a hornzontal cross-sectional view of the disc-dispenser on line 18—18 of Fig. 15, scale X.

Fig. 19 is a vertical cross-sectional view of the lower portion of the disc-dispenser on line 19—19 of Fig. 18, scale X.

Fig. 20 is a side view of the peg-lifter resting on the

2 table top and supporting the pegs in an elevated position, scale ½X.

Fig. 21 is an end view of the peg-lifter resting on the table top and supporting the pegs in an elevated position, scale ½X.

Fig. 22 is a vertical cross-sectional view of the peg-lifter on line 22—22 of Fig. 20, scale ½X.

Fig. 23 is a front view of the cut-fill measurer, scale ½X.

Fig. 24 is a side view of the cut-fill measurer, scale ½X.

Fig. 25 is a side view of the grade-measurer scale ½X.

Fig. 26 is an end view of the grade-measurer, scale ½X.

Referring now more particularly to the drawings, and to the characters of reference marked thereon, the framework of the device comprises a table top 30, a capital 31 thereunder, a shaft 32 depending from the capital and turnable in a rigid sleeve 33, and a base unit 34—34a.

The table top is secured to the metal capital 31 by bolts, and said capital is secured by welding to the shaft 32. The metal sleeve 33 is secured by welding to the metal base 34, which in turn is secured to the larger base 34a, and of lighter-than-metal material, by suitable bolts, as indicated in Fig. 1. The table top is thus supported for free rotation about the sleeve 33 as an axis.

The table top 30 has a plurality of parallel rows of holes 35 therethrough arranged and spaced on a square grid system, as indicated in Fig. 2. Elongated pegs 36 are inserted through said holes; their vertical positions being determined by a peg measurer as later described.

The pegs 36 are square in cross-section, as shown in Fig. 7, and are of a length approximately equal to the distance between the table top 30 and its base 34, as shown in Fig. 6. There is a mark 37 near the top of each peg 36 which is the ground elevation mark; above this mark, the peg is colored blue—below this mark, the peg is colored red. On the pegs 36 there are opposed grooves 38 which receive the peg-disc supporters 39. The grooves are spaced apart equally and closely together. The topmost groove on the peg 36 is below the ground elevation mark 37 a distance equal to the thickness of ten discs 40. To facilitate measuring the pegs 36 there is a mark 41 on the smooth sides of the pegs at each fifth groove, beginning at the topmost groove. The peg 36 is pointed at the bottom so that it can be easily inserted through a hole 35 in the table top 30.

The peg measurer 42, shown in Figs. 11–14, is used to measure the pegs to simulate rod readings or elevations taken from a gridded spirit level survey of a field to be leveled or graded.

The peg measurer 42 is graduated in evenly spaced units numbered from zero up, each unit representing a foot of measurement on a surveyor's rod, and the actual spacing between adjacent units being equal to the distance between ten grooves 38 on the pegs 36. Holes 43 are drilled in the peg measurer, being held in any desired position by a pin 45 in the indicator body and adapted to engage any hole 43. The indicator also includes a pointer 47 depending from the lower flat face 46 of the body 44, and here shown in the form of a strip set close to the graduated face of the peg measurer.

The length of the pointer 47 from face 46 to its outer end is equal to the length of any peg 36 from its tip to the first groove 38 thereon. This is done to "zero" the indicator; that is, all rod readings or elevations will be "zeroed" to the ground elevation 37 on any peg 36, rather than to the top of the peg.

When "setting up" for a job, after the survey of the field to be leveled or graded has been made, the indicator 44 is set on the peg measurer so that the lower end of the pointer reads against the next larger unit number on the peg measurer than the largest rod reading of the survey; such reading as usual denoting the lowest point on the field. The pointer and the face 46 of the indicator both face the lower or zero-marked end of the graduated scale on the peg measurer.

The distance between the outer end of the pointer 47 and the pin 45 is not critical; it being only necessary that said pin registers with a hole 43 when the outer end of the pointer alines with a unit number on the scale.

After the indicator has thus been positioned on the peg measurer, the latter is rested on the table top 30, or other flat surface, in order that the necessary supporters 39 may be properly positioned on the pegs 36, according to the survey figures. A peg is then laid on the peg measurer, with the upper end of the peg held against the indicator face 46. A supporter 39 is then mounted on the rod at the topmost groove 38 (which is alined with the outer end of the pointer 47), and another such supporter 39a is then mounted on the peg at a point which alines with the actual rod reading at the first station.

When this is done, the peg is then inserted through the hole 35 in the table top 30 at the station corresponding to the station in the field. The last supporter 39 placed on the peg as above described then supports the peg from the table, while the supporter 39 first placed on the peg serves to support a stack of the discs 40, as illustrated in Fig. 1.

Another peg is then laid on the measurer 42, and two supporters 39 are then placed thereon—one in alinement with the lower end of the pointer, as before, and the other in alinement with the actual rod reading at the second station. These operations are continued until all the field stations of the survey have been taken care of. The indicator 44, having been once set, is never thereafter disturbed for the one job at hand.

If elevation figures are used in the field survey, the indicator 44 is reversed in position on the measurer, and the pointer 47 is set to read against the next smaller reading on the scale than the actual rod reading, since elevation readings are the reciprocal of the rod readings, as is well known.

By the above means, the various pegs 36 are measured to represent scale rod-readings or elevations of stations in a field to be leveled or graded. The rod-readings or elevations are determined in the field by an engineer's spirit level. The stations in the field to be leveled or graded are on a square grid similar to the holes in the table top 30. The measured pegs 36 are supported at the desired scaled rod-readings or elevations by the peg-disc supporters 39.

As shown in Figs. 8 and 9, said peg-disc supporters 39 are discs cut away or slotted radially so that they may engage any opposed pair of peg grooves and embrace the peg in supported relation. After a measured peg for each station in the field has been inserted into the table top 30, the tops of the pegs will represent a three-dimensional scaled model of the surface shape of the land to be leveled or graded, thus effecting object 1 of the invention.

Instead of considering the tops of the pegs as the ground elevation, a mark 37 on the peg will be the ground elevation. The peg-disc supporters 39 are placed on the pegs 36 in the topmost grooves. From a disc-dispenser ten discs 40 are placed on each peg. The ground elevation mark 37 will coincide with the top of the tenth disc. The top disc can then be considered the ground level for a particular station. By shifting discs 40 from one peg 36 to another peg, the surface shape of the model can be quickly and easily changed—thus accomplishing object 2 of the invention.

If a station requires a cut of more than ten discs 40 to attain a desired grade, the peg-disc supporter 39 is lowered to the tenth groove below the top groove on the peg 36 and twenty discs are placed on the peg. This procedure may be expanded for larger cuts than twenty discs.

A disc dispenser, shown in Figs. 15–19, is preferably used for the purpose of placing the stacks of discs on the pegs. Such dispenser comprises a tube having at the bottom end a cut-away section and a slit in the tube; a plug 48 having a slit and fastened to said tube so that the slit in the plug and the slit in the tube coincide and so that an opening 49 is left in the side of the tube; a blade 50, with a handle, said blade being inserted in the slit in the plug and attached by means of a pivot 51; a spring 52 coacting with the tube and the handle of blade 50 to keep the blade retracted. The discs 40 are fed into the tube and dispensed in equal numbers when blade 50 is pressed inwards. A visor 66 is provided which when lowered prevents the discs 40 from falling out when loading.

When the surface shape of the scaled model has been changed, the amount of change at each station can be determined by counting the number of discs 40 taken from a peg 36 or the extra number of discs placed on a peg.

The number of discs is then multiplied by the vertical scale to obtain the amount of change. To eliminate counting, a cut-fill measurer 53, Figs. 23 and 24, has been devised. Each unit on the cut-fill measurer is equal to the thickness of a disc 40. The cut-fill measurer 53 measures the number of discs 40 placed on a peg or removed from a peg 36. For easy reading, the cut-fill measurer 53 is designed so that the reading may be taken at the top of the peg 36 instead of at the ground elevation mark 37. This accomplishes object 3 of the invention.

It will be noted that when the discs are removed from a peg 36, a red color will be exposed, indicating cut. On the other hand, when discs 40 are placed on a peg 36, a blue color only will be seen, indicating fill.

To design the cut-fill measurer 53 for easy reading, the zero point on the measurer was placed opposite the top of the peg 36 when the bottom of said measurer 53 was held even with the ground elevation mark 37 on the peg 36. The numbers on the cut-fill measurer 53 from zero up represent cut and the numbers from zero down respresent fill. The amount of cut or fill is determined then, by placing the bottom of the cut-fill measurer 53 on the top of the pile of discs 40 and taking a reading opposite the top of peg 36. Multiply this reading, which is the number of discs 40 removed from or placed on a peg, by the vertical scale to obtain the cut or fill at a station.

To be able to view any selected profile of the model, a peg-lifter 54, Figs. 20 to 22, has been devised. The cross-sectional shape of this lifter is an inverted T-shaped bar of a length sufficient to extend across the table top 30. A lifter leg 55 is attached to each end by a hinge 56. The peg-lifter is inserted between two rows of pegs with the flanges 57, Fig. 22, on the peg-lifter 54 passing underneath the peg-disc supporters 39. When the lifter legs 55 are turned downward and supported on the table top 30, two rows of pegs 36 are then lifted above the level of adjacent rows of pegs 36. The cross-sectional surface profile of the model at any row may be viewed easily by using the peg-lifter 54. This accomplishes object 4 of the invention.

The above operation of the peg lifter is made possible or greatly facilitated by the sleeve-like lifts 58 which surround each hole 35 in the table top and upstand therefrom, as shown in Fig. 3. These lifts are smaller in their exterior diameter than the peg-disc supporters 39, so that there is a vertical space between such supporters and the table top for the reception of the peg lifter.

To be able to change the surface shape of the model to a desired grade, a grade-measurer, Figs. 25 and 26, has been developed. The grade-measurer is constructed of two pieces of transparent plastic-like material, the frame 59 and the measuring arm 60. The frame has two towers with holes 61 spaced evenly apart. The measuring arm 60 is fastened at one end by a nut and bolt 62 and at the other end by a nut and bolt 63. The holes 61 in both towers are spaced apart so that the measuring arm 60 will be on a grade equal in percent to the vertical scale of the discs 40. For example, if the discs 40 are on a scale of one disc equals 0.1 of a foot, the percent grade is 0.1% when the measuring arm 60 is inclined so that there is one vertical space between nut and bolt 62 and nut and bolt 63. The measuring arm 60 may be set at a variety of grades by pivoting the arm in a selected hole on the smaller tower and fastening the other end of the measuring arm 60 to any hole in the large tower. A slit 64 in the measuring arm 60 allows this adjustment. Also, the measuring arm 60, on a specified grade can be set at various levels by moving both ends of the arm up or down the tower the same number of spaces. The grade-measurer, Figs. 25 and 26, is used by placing it on top of the peg-lifter 54, Fig. 20, when the peg-lifter is inserted between two rows of pegs 36. There are tabs 65 on the grade-measurer which hold it in place on top of the peg lifter 54.

To be able to arrive at a desired cut to fill balance to compensate for compaction or shrinkage of the fill, a technique has been developed. When the discs 40 have been shifted from peg to peg to attain the desired grade on the model, the amount of cut will equal the amount of fill. In practice, it is necessary to have more cut than fill to allow for shrinkage or compaction. This is accomplished by removing from the pegs 36 a few discs from each row of pegs 36 as the grade on the model is being made—thereby lowering the plane of the field and increasing the cut to fill percentage. At the end of the job, the cuts and fills are totaled. The percentage of cut to fill is calculated. Then further removal or replacement of discs 40 on a trial and error basis is made until the required cut to fill percentage is attained. This accomplishes object 7 of the invention.

I claim as my invention:

1. In a land leveling computing device, a table top having parallel rows of holes therethrough, tubes set in the holes and projecting above the table top equal amounts, peg slidably projecting through the holes and tubes, disc supporting elements axially immovably mounted on the pegs at predetermined distances from the upper ends of the pegs, said elements being supported on the tubes so that the upper ends of the pegs are predetermined distances from the table top; the disc supporting elements being larger in diameter than the tubes so that said elements overhang the tubes, whereby a straight flat-edged member separate from the table top may be slid along the table between selected adjacent rows of pegs below said elements and be simultaneously engaged with the overhanging portions of the elements of all the pegs of such adjacent rows thereof in lifting relation whereby when such member is lifted, all such pegs will be lifted the same distance from the table top.

2. A device, as in claim 1, in which the member is a bar of inverted T-shape in cross section slidable on the table top into an element-engaging position from one end of and between said adjacent rows, and legs hinged to said bar at the ends thereof for movement between a horizontal and a depending vertical position and adapted when depending to rest on the table top.

3. A land leveling computing device comprising a table top having a multiplicity of holes drilled therethrough and arranged in grid form, pegs to removably project through said holes, disc-supporting elements mounted on the pegs at a predetermined and fixed distance from the upper ends of the pegs, and other peg-engaging elements adapted to be mounted thereon at different points below the first named elements, and arranged to be located on the pegs at different distances from their upper end according to the rod readings of a survey made of the land to be leveled; the last named elements supporting the pegs from the table top when the pegs are projected into said table top holes, and stacks of discs, all of the same thickness and each stack initially containing the same number of discs, removably mounted on the different disc-supporting elements.

4. A land leveling computing device comprising a table top having a multiplicity of holes drilled therethrough and arranged in grid form, pegs to removably project through said holes, disc-supporting elements mounted on the pegs at a predetermined and fixed distance from the upper ends of the pegs, a stack of discs of the same initial height on each of the stack-supporting elements, and other elements adapted to be mounted against movement lengthwise on the pegs and to be located thereon in proportion and according to the rod readings of a survey made of the land to be leveled when considering the top of the stacks to be the ground level of such land at the corresponding stations.

5. In a land-leveling computing device, a table having holes through the top thereof, pegs having grooves on opposed sides thereof, said grooves being spaced equally and closely together and said pegs being adapted to be inserted into the table-top holes, peg-disc supporters having slots adapted to fit onto the pegs and adapted to support the same from the table top when said pegs are inserted into the table holes, and washer-like discs having a thickness equal to the spacing between adjacent grooves on said pegs and adapted to be removably placed on the pegs; the peg-disc supporters having slots adapted to fit onto the pegs at any selected grooves to support said washer-like discs.

6. A device, as in claim 5, in which the holes are disposed in rows arranged as a square grid.

References Cited in the file of this patent

UNITED STATES PATENTS

| | | |
|---|---|---|
| 239,691 | Appleton | Apr. 5, 1881 |
| 858,498 | Bartels | July 2, 1907 |
| 932,702 | Harris | Aug. 31, 1909 |
| 1,199,355 | Edmiston | Sept. 26, 1916 |
| 1,278,632 | Gerashshenevsky | Sept. 10, 1918 |
| 1,683,952 | Cadman | Sept. 11, 1928 |
| 1,926,426 | Blake | Sept. 12, 1933 |
| 2,345,424 | Pfeifer | Mar. 28, 1944 |
| 2,391,243 | Hutton | Dec. 18, 1945 |
| 2,393,162 | Hayes | Jan. 15, 1946 |
| 2,410,888 | Lucy | Nov. 12, 1946 |
| 2,753,633 | Calver | Sept. 26, 1956 |

FOREIGN PATENTS

| | | |
|---|---|---|
| 30,180 | Germany | Jan. 10, 1885 |
| 255,624 | Great Britain | July 29, 1926 |